(12) United States Patent
Neate

(10) Patent No.: US 9,396,924 B2
(45) Date of Patent: Jul. 19, 2016

(54) LIGHT SOURCE

(75) Inventor: Andrew Simon Neate, Aylesbury (GB)

(73) Assignee: Ceravision Limited, Milton Keynes (GB)

( * ) Notice: Subject to any disclaimer, the term of this patent is extended or adjusted under 35 U.S.C. 154(b) by 773 days.

(21) Appl. No.: 13/319,347

(22) PCT Filed: May 6, 2010

(86) PCT No.: PCT/GB2010/000911
§ 371 (c)(1),
(2), (4) Date: Jan. 26, 2012

(87) PCT Pub. No.: WO2010/128301
PCT Pub. Date: Nov. 11, 2010

(65) Prior Publication Data
US 2012/0119648 A1 May 17, 2012

Related U.S. Application Data
(60) Provisional application No. 61/186,352, filed on Jun. 11, 2009.

(30) Foreign Application Priority Data
May 8, 2009 (GB) .................................. 0907947.6

(51) Int. Cl.
H01J 65/04 (2006.01)
H05B 41/28 (2006.01)

(52) U.S. Cl.
CPC .......... *H01J 65/044* (2013.01); *H05B 41/2806* (2013.01); *Y02B 20/22* (2013.01)

(58) Field of Classification Search
CPC ............................. H05B 41/04; H01J 65/044
See application file for complete search history.

(56) References Cited

U.S. PATENT DOCUMENTS

| 4,041,352 | A | | 8/1977 | McNeill et al. | |
|---|---|---|---|---|---|
| 4,498,029 | A | * | 2/1985 | Yoshizawa et al. | 315/39 |
| RE32,626 | E | * | 3/1988 | Yoshizawa et al. | 315/39 |
| 5,786,667 | A | | 7/1998 | Simpson | |
| 6,424,099 | B1 | * | 7/2002 | Kirkpatrick et al. | 315/248 |
| 2002/0011802 | A1 | * | 1/2002 | Espiau et al. | 315/246 |
| 2002/0030453 | A1 | | 3/2002 | Kirkpatrick | |
| 2007/0273262 | A1 | * | 11/2007 | Sortais et al. | 313/62 |
| 2010/0060167 | A1 | * | 3/2010 | Neate et al. | 315/39 |
| 2010/0270920 | A1 | * | 10/2010 | Neate | 313/607 |

FOREIGN PATENT DOCUMENTS

| EP | 1564788 | | 9/2007 |
|---|---|---|---|
| EP | 1612842 | | 10/2010 |
| JP | 62 055858 | | 3/1987 |
| WO | 95/12222 | | 5/1995 |
| WO | WO2006129102 | * | 12/2006 |

* cited by examiner

Primary Examiner — Don Le
(74) Attorney, Agent, or Firm — Bay State IP, LLC

(57) ABSTRACT

An electrodeless, microwave lamp has a magnetron as a microwave source and an excitable material lucent crucible in whose excitable material a plasma is established. For coupling microwaves from the magnetron into the crucible, an air wave guide coupling circuit is provided, with an output of the magnetron as an input at one quarter lambda from one end and an output at one quarter from the other end as an input to a connection to the crucible.

6 Claims, 3 Drawing Sheets

LIGHT SOURCE

CROSS REFERENCE TO RELATED APPLICATION

This application is for entry into the U.S. National Phase under §371 for International Application No. PCT/GB2010/000911 having an international filing date of May 6, 2010, and from which priority is claimed under all applicable sections of Title 35 of the United States Code including, but not limited to, Sections 120, 363, and 365(c), and which in turn claims priority under 35 USC 119 to United Kingdom Patent Application No. 0907947.6 filed on May 8, 2009 and to U.S. Patent Application No. 61/186,352 filed on Jun. 11, 2009.

BACKGROUND OF THE INVENTION

1. Field of the Invention

The present invention relates to a light source.

2. Description of the Related Art

In U.S. Pat. No 6,737,809 there is described and claimed:
1. A lamp comprising:
   (a) a waveguide having a body comprising a ceramic dielectric material of a preselected shape and preselected dimensions, the body having a first side determined by a first waveguide outer surface;
   (b) a first microwave feed positioned within and in intimate contact with the waveguide body, adapted to couple microwave energy into the body from a microwave source having an output and an input and operating within a frequency range from about 0.5 to about 30 GHz at a preselected frequency and intensity, the feed connected to the source output, said frequency and intensity and said body shape and dimensions selected such that the body resonates in at least one resonant mode having at least one electric field maximum;
   (c) an enclosed first cavity depending from said first surface into the waveguide body; and
   (d) a first bulb positioned in the cavity at a location corresponding to an electric field maximum during operation, the bulb containing a gas-fill which when receiving microwave energy from the resonating waveguide body forms a light-emitting plasma.

We name this lamp a ceramic waveguide lamp and have developed its technology and in particular have developed a matching circuit for matching the output impedance of a microwave source to the input impedance of the waveguide. This is described in our International Patent Application No PCT/GB2007/001935 ("the 1935 Application"). On entry to the UK national phase, under No GB 0820183.2 the main claim was amended as follows:
1. A lamp to be driven from a source of microwave energy, the lamp comprising:
   an electrodeless, discharge bulb,
   a radiator for radiating microwave energy to the bulb,
   a bulb receptacle formed of ceramic material coated with an electrically conductive shield, the receptacle having:
      a first recess containing the bulb, the recess being open to allow light to shine from the bulb and
      a second recess containing the radiator, with the second recess being open to allow connection of microwaves to the radiator and
   a microwave circuit having:
      an input for microwave energy from the source thereof and
      an output connection thereof to the radiator in the ceramic receptacle, wherein the microwave circuit is a capacitative-inductive circuit configured as a bandpass filter and matching output impedance of the source of microwave energy to input impedance of the circuit, receptacle and bulb combination.

SUMMARY OF THE INVENTION

In our development of electrodeless bulbs in a waveguide, we have combined the lamp and the waveguide, allowing the light to radiate through the waveguide. This development is the subject of our International Patent Application No. PCT/GB2008/003829. This describes and claims:
1. A light source to be powered by microwave energy, the source having:
   a solid plasma crucible of material which is lucent for exit of light therefrom, the plasma crucible having a sealed void in the plasma crucible,
   a Faraday cage surrounding the plasma crucible, the cage being at least partially light transmitting for light exit from the plasma crucible, whilst being microwave enclosing,
   a fill in the void of material excitable by microwave energy to form a light emitting plasma therein, and
   an antenna arranged within the plasma crucible for transmitting plasma-inducing microwave energy to the fill, the antenna having:
      a connection extending outside the plasma crucible for coupling to a source of microwave energy;
the arrangement being such that light from a plasma in the void can pass through the plasma crucible and radiate from it via the cage.

For understanding of this light source, we use the following definitions: "lucent" means that the material, of which the item described as lucent, is transparent or translucent; "plasma crucible" means a closed body enclosing a plasma, the latter being in the void when the void's fill is excited by microwave energy from the antenna.

We name this light source an LER.

We have noted a significant difference between a ceramic waveguide lamp using an electrodeless bulb inserted in the waveguide and an LER. In the former, there is a change of input impedance of the waveguide between start-up and steady state operation. This causes a mismatch of impedance with the output impedance of the microwave source driving the lamp. This mismatch is accommodated in the bandpass matching circuit of our 1935 Application, enabling it to pass microwave energy both on start up on during normal operation. In the case of the LER there is no such change in input impedance. Indeed we have been surprised to note that the input impedance of the LER remains substantially constant between start-up and normal operation In the event, we can use a simpler matching circuit.

The object of the present invention is to provide an improved light source of our LER type.

According to the invention there is provided a light source to be powered by microwave energy, the source having:
   a solid plasma crucible of material which is lucent for exit of light therefrom, the plasma crucible having a sealed void in the plasma crucible,
   a Faraday cage surrounding the plasma crucible, the cage being at least partially light transmitting for light exit from the plasma crucible, whilst being microwave enclosing,
   a fill in the void of material excitable by microwave energy to form a light emitting plasma therein, and an antenna arranged within the plasma crucible for transmitting plasma-inducing microwave energy to the fill, the antenna having:
a connection extending outside the plasma crucible for coupling to a source of microwave energy;
the light source being characterised by the inclusion of:
a source of microwaves at a frequency to excite resonance within the lucent crucible and the Faraday cage for excitation of a light emitting plasma in the sealed void and
a waveguide for coupling microwaves from the generator to the antenna, the waveguide being:
substantially two or more half wave lengths long and having:
a waveguide input from the generator positioned close to an input end of the waveguide and
a waveguide output to the antenna connection positioned close to an output end of the waveguide.

In the preferred embodiment, the waveguide input and the waveguide output are positioned symmetrically, that is equidistant from their respective ends. Nevertheless it can be envisaged that they may not be symmetrical, at a likely efficiency penalty.

Equally in the preferred embodiment, the input and the output are positioned at one quarter wavelength from their respective ends. Again it can be envisaged that they may be positioned at different fractions/percentages of a wavelength from the ends.

Whilst the waveguide could be comprised of solid dielectric material, preferably it is an air waveguide. The waveguide could be of circular cylindrical transverse cross-section, but we prefer to use a rectangular cross-section.

Again whilst the microwave generator could be an electronic oscillator and amplifier device, it is preferably a magnetron.

In the preferred embodiment:
the wave guide is a metallic trough of substantially one wavelength in length and having a metallic closure and preferably
the microwave generator is mounted on a face of the trough or on the metallic closure and preferably
the wave guide input is an output of the microwave generator, which passes through the face or the closure and preferably
the wave guide output is fastened to a face of the trough or the closure and extends to the central longitudinal axis of the trough and extends therealong out of the trough to the antenna connection, with which it is integral.

Preferably the antenna connection is a coaxial connection to the antenna, which is preferably provided with a coaxial outer member surrounding the antenna connection.

Preferably, the coaxial outer member is a rigid metallic sleeve fast with the waveguide and a ceramic insulator is provided between the antenna connection and the sleeve; and preferably the metallic sleeve carries the plasma crucible at its end remote from the wave guide, with the Faraday cage being connected to the metallic sleeve.

Conveniently, the Faraday cage has a band extending towards the metallic sleeve, the band being fastened to the metallic sleeve for carrying of the plasma crucible by the sleeve.

In another aspect, the invention provides a light source to be powered by microwave energy, the source having:
a solid plasma crucible of material which is lucent for exit of light therefrom, the plasma crucible having a sealed void in the plasma crucible,
a Faraday cage surrounding the plasma crucible, the cage being at least partially light transmitting for light exit from the plasma crucible, whilst being microwave enclosing,
a fill in the void of material excitable by microwave energy to form a light emitting plasma therein, and
an antenna arranged within the plasma crucible for transmitting plasma-inducing microwave energy to the fill, the antenna having:
a connection extending outside the plasma crucible for coupling to a source of microwave energy;
the light source also including:
a controllable source of microwaves coupled to the antenna connection;
a starter for starting a plasma in the fill in the sealed void,
a detector for detecting starting of the plasma and
a control circuit for powering the source at low power initially and simultaneously with the starter and switching off the starter and increasing power of the microwave source after detection of starting of the plasma.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENTS

Figure 1:
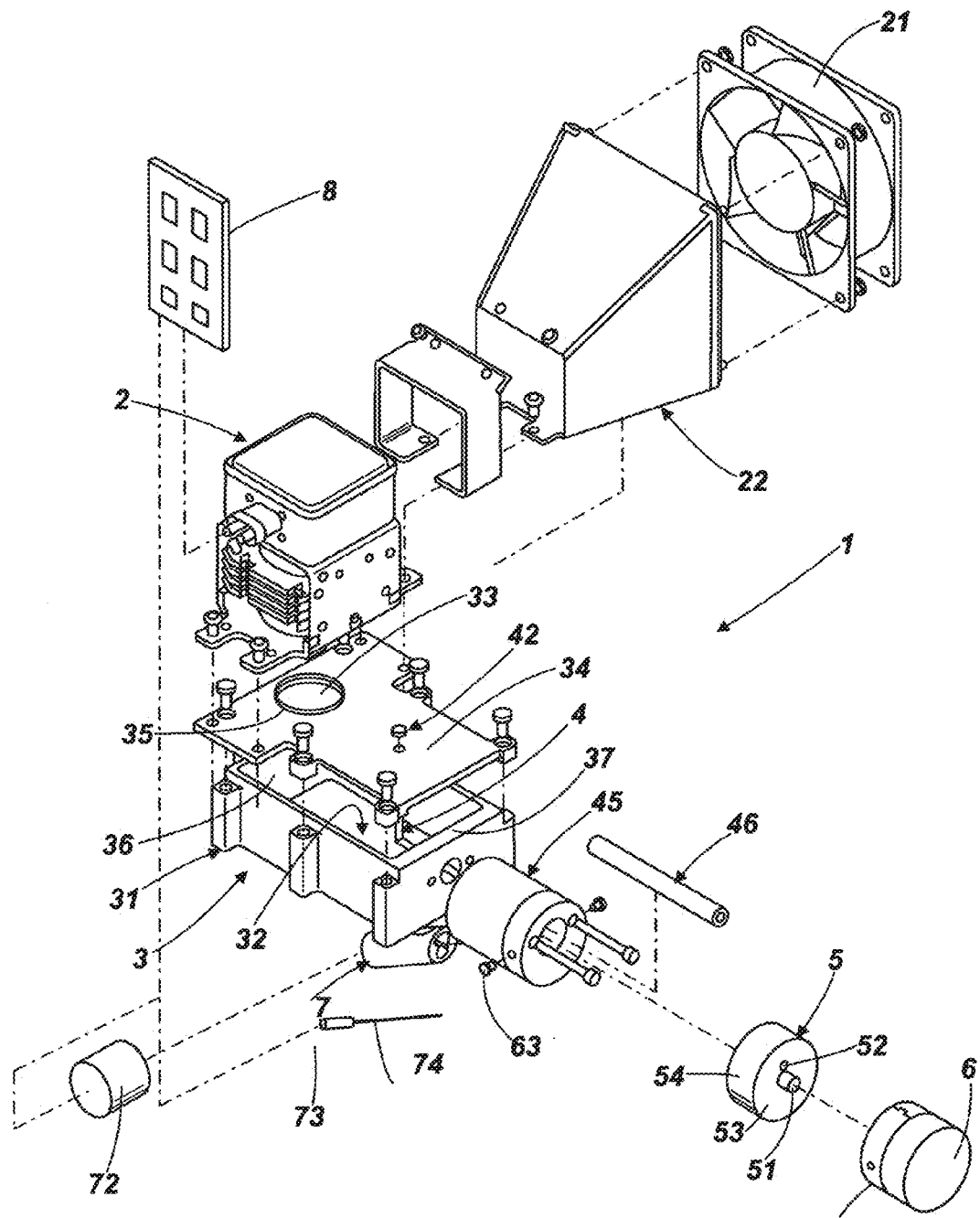
FIG. 1 is an exploded view of a light source in accordance with the invention.
Figure 2:
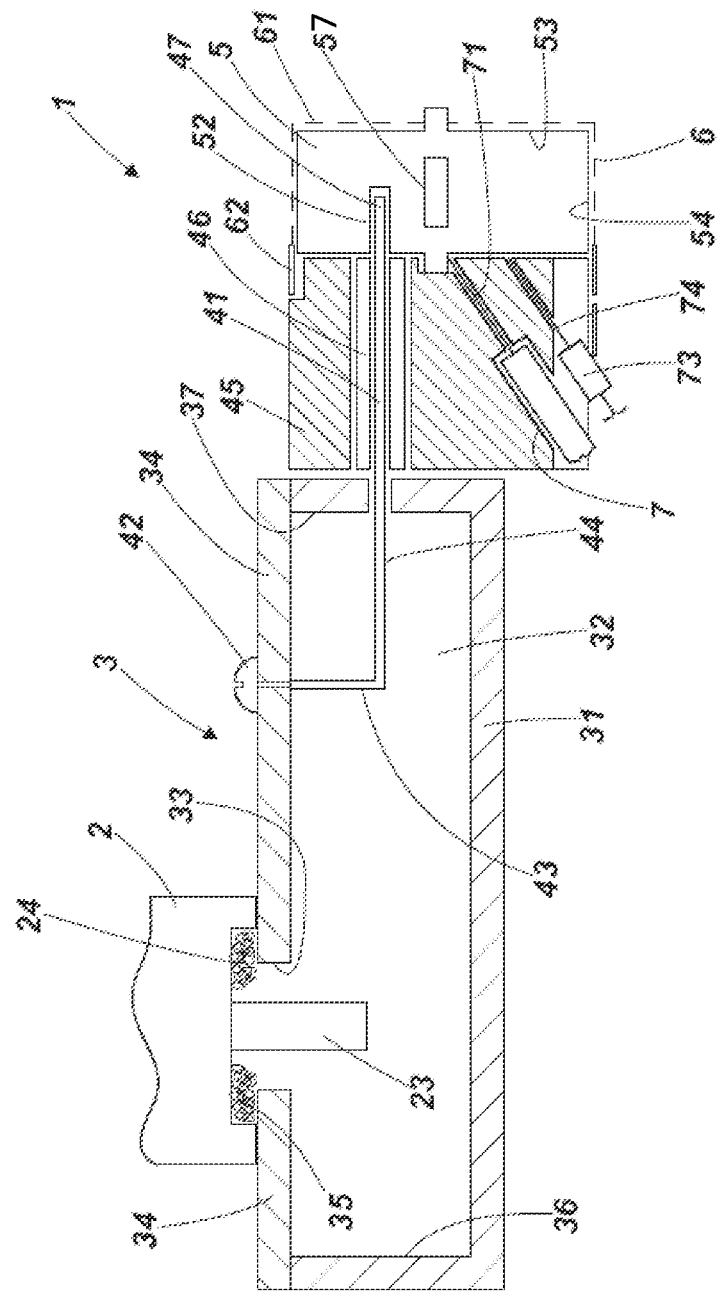
FIG. 2 is a cross-sectional side view of the light source along its longitudinal axis.

Referring to the drawings, an electrodeless, microwave lamp 1 has:
a magnetron 2, which is a conventional magnetron as used in a microwave oven, provided with a cooling a fan 21 and duct 22 and which operates at 2.45 GHz;
an air waveguide matching circuit 3, in the form of a rectangular aluminium trough 31 enclosing an air filled cavity forming waveguide 32, which is of rectangular cross-section transverse to its length. For inputting microwaves into the cavity, the output antenna 23 of the magnetron extends through an aperture 33 in a lid 34 closing the enclosure. A rim 35 of the aperture 33 is in firm ground contact with ground mesh 24 of the magnetron surrounding the antenna. The internal dimensions of the waveguide are:

| | |
|---|---|
| Length | 121.7 mm |
| Width | 72.9 mm |
| Height | 42.8 mm. |

The length of the waveguide is one wave length—$\lambda$—of 2.45 GHz microwave radiation in air, adjusted for the shape of the components. The output antenna 23 of the magnetron is arranged at $\frac{1}{4}\lambda$ from one end 36 of the waveguide;
a microwave conductor 4 forming an output from the air wave guide for inputting microwaves to an antenna connection 41 is attached by a screw 42 to the lid 34 at $\frac{1}{4}\lambda$ from the other end 37 of the waveguide. This position provides for maximum voltage to be transmitted on. The conductor has a resonator portion 43, the portion held by the screw, and turns through a right angle to an output portion 44 at half the height of the waveguide and passes through an end wall 37 of the trough 31. Thence it extends as the antenna connection per se through an aluminium crucible holder 45. This houses a ceramic insulator 46, giving the connection with the crucible holder a co-axial property;

a lucent crucible 5 in the form of a disc of quartz having:

| | |
|---|---|
| Diameter | 49 mm |
| Length | 21 mm. |

It has a sealed, central void 57 filled with excitable material and an offset bore 52 for receiving the antenna end 47 of the conductor 4. This end, although integral with its antenna connection portion 41 and its output portion 44 within the trough, comprises an antenna for inputting microwave energy into the crucible;

a perforate Faraday cage 6 covers the exposed end 53 and the side 54 of the crucible. The cage comprises perforate sheet metal 61 and has an imperforate band 62, via which it and the crucible is fastened to the crucible holder 45 with screws 63;

a ceramic insert 7 for a starter extends obliquely into the crucible holder, and supports an electrode 71 which extends close to the end 47 of the conductor. It is connected to a starter circuit 72 adapted to apply pulsed high voltage, which starts the plasma discharge when the magnetron is driven at low power. A photodiode 73 is mounted in the holder at a position to detect light from the crucible, via an optic fibre 74;

a control circuit 8 is connected to the magnetron, to provide it with drive current, to the starter circuit to control it and to the photodiode. When the lamp is to be switched on, low drive current is applied to the magnetron and the starter is operated. Once the photodiode detects light, the starter is switched off and the power to the magnetron is increased. The light source is then operational.

Figure 3:
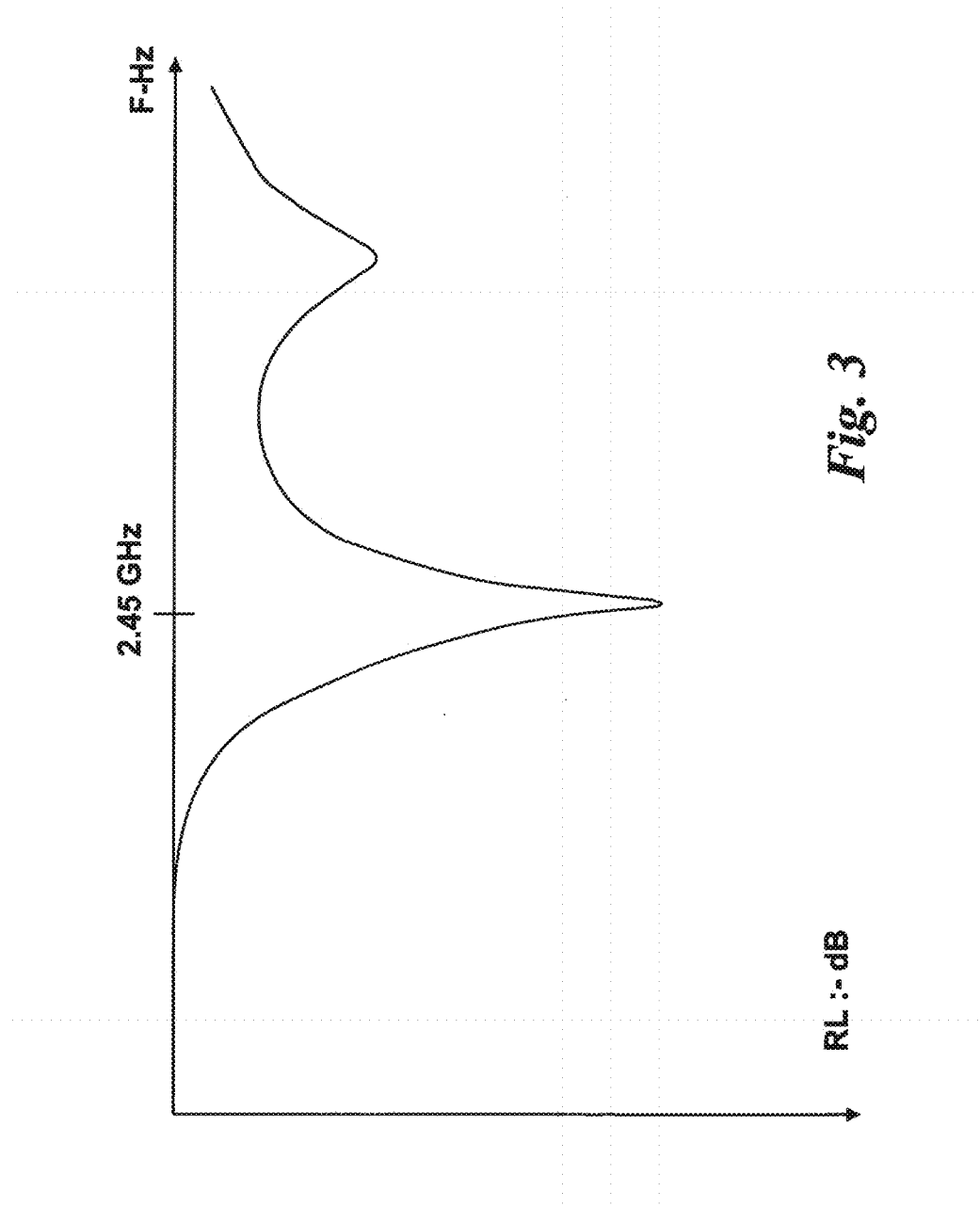
FIG. 3 is a plot of Return Loss (RL) response to input frequency with varying frequency of waveguide matching circuit of the lamp.

It will be noted particularly from its frequency characteristic shown in FIG. 3 that the waveguide acts as a transmission line between the magnetron and the coaxial connection to the antenna and the lucent crucible.

The invention is not intended to be restricted to the details of the above described embodiment. In particular it is not restricted to operating at 2.45 GHz. We anticipate that it can operate between an order of magnitude lower and an order of magnitude higher than this frequency, bearing in mind that the length of the cavity in terms of the wavelength of microwaves or electromagnetic waves for one wavelength is inversely proportional to the frequency. In particular we anticipate operating at 434 MHz and lower and at 5.2 GHz and higher and at frequencies in between. At higher frequencies, the overall length can be increased by multiples of half lambda. Indeed this is possible at lower frequencies but does result in extra length of a component that is already getting long.

The invention claimed is:

1. A light source to be powered by microwave energy, the source comprising:
    a plasma crucible of material which is lucent for exit of light therefrom, the plasma crucible having a sealed, central void,
    a perforate Faraday cage surrounding the plasma crucible, the cage being at least partially light transmitting for light exit from the plasma crucible, whilst being microwave enclosing,
    a plasma fill in the void that is excitable by microwave energy to form a light emitting plasma
    an antenna arranged within the plasma crucible for transmitting plasma-exciting microwave energy to the fill, the antenna comprising:
        an antenna connection extending outside the plasma crucible for coupling to a source of microwave energy;
    a source of microwaves at a frequency to excite resonance within the plasma crucible and the Faraday cage for excitation of the light emitting plasma in the sealed, central void; and
    an air waveguide for coupling microwaves from a generator to the antenna, the waveguide being:
        substantially two or more half wave lengths long comprising:
        a waveguide input from the generator positioned close to an input end of the waveguide and
        a microwave conductor positioned close to an output end of the waveguide, the microwave conductor comprising:
            a resonate portion, and
            an output portion, the resonator portion turning through a right angle to the output portion, the output portion being located at half the height of the waveguide and extending as an antenna connection.

2. A light source as claimed in claim 1, wherein an output power of the microwave source is controllable by the inclusion of:
    a starter for starting a light emitting plasma fill in the sealed, central void,
    a detector for detecting starting of the plasma and
    a starter circuit for powering the source at low power initially and simultaneously with the starter and switching off the starter and increasing power of the microwave source after detection of starting of the plasma.

3. A light source as claimed in claim 1, wherein the microwave source is a magnetron.

4. A light source to be powered by microwave energy, the source comprising:
    a plasma crucible of material which is lucent for exit of light therefrom, the plasma crucible having a sealed, central void therein,
    a perforate Faraday cage surrounding the plasma crucible, the cage being at least partially light transmitting for light exit from the plasma crucible, whilst being microwave enclosing,
    a plasma fill in the void the fill being excitable by microwave energy to form a light emitting plasma, and
    an antenna arranged within the plasma crucible for transmitting plasma-inducing microwave energy to the fill, the antenna comprising:
        an antenna connection extending outside the plasma crucible for coupling to a source of microwave energy;
    the light source being characterised by the inclusion of:
    a controllable source of microwaves coupled to the antenna connection;
    a starter for starting a plasma in the fill in the sealed, central void,
    a detector for detecting starting of the plasma and
    a starter circuit for powering the source at low power initially and simultaneously with the starter and switching off the starter and increasing power of the microwave course after detection of starting of the plasma; and a microwave conductor positioned close to an output end of the waveguide, the microwave conductor comprising:
a resonate portion, and
an output portion, the resonator portion turning through a right angle to the output portion, the output portion being located at half the height of the waveguide and extending as an antenna connection.

5. A light source as claimed in claim 4, wherein the microwave source is an electronic oscillator and amplifier device.

6. A light source as claimed in claim 4, wherein the microwave source is a magnetron.

\* \* \* \* \*